(12) United States Patent
Aoki et al.

(10) Patent No.: US 8,153,898 B2
(45) Date of Patent: Apr. 10, 2012

(54) POWER FEEDING DEVICE FOR SLIDE STRUCTURE

(75) Inventors: Tohru Aoki, Kosai (JP); Hiroshi Yamashita, Kosai (JP); Kazuhiro Tsuchida, Kosai (JP); Mitsunori Tsunoda, Kosai (JP); Tomoaki Nishimura, Kariya (JP); Motonari Inagaki, Aichi-ken (JP)

(73) Assignees: Yazaki Corporation, Tokyo (JP); Aisin Seiki Kabushiki Kaisha, Aichi-ken (JP)

( * ) Notice: Subject to any disclaimer, the term of this patent is extended or adjusted under 35 U.S.C. 154(b) by 353 days.

(21) Appl. No.: 12/446,994

(22) PCT Filed: Oct. 31, 2007

(86) PCT No.: PCT/JP2007/071258
§ 371 (c)(1),
(2), (4) Date: Apr. 24, 2009

(87) PCT Pub. No.: WO2008/053938
PCT Pub. Date: May 8, 2008

(65) Prior Publication Data
US 2010/0089642 A1  Apr. 15, 2010

(30) Foreign Application Priority Data

Oct. 31, 2006 (JP) .................................. 2006-295324

(51) Int. Cl.
*H01B 9/00* (2006.01)
(52) U.S. Cl. ................... 174/72 A; 174/68.3; 174/72 C; 174/70 R; 439/502

(58) Field of Classification Search ................. 174/68.3, 174/72 A, 72 C, 70 R; 439/11, 34, 502, 503; 49/152, 246; 248/51
See application file for complete search history.

(56) References Cited

U.S. PATENT DOCUMENTS 6,492,592 B1 * 12/2002 Murofushi et al. ......... 174/72 A
7,265,295 B2 *  9/2007 Kogure et al. ............ 174/72 A
(Continued)

FOREIGN PATENT DOCUMENTS
JP  2001-122054 A  5/2001
(Continued)

OTHER PUBLICATIONS

Office Action dated Sep. 20, 2011 from the Japanese Patent Office in counterpart Japanese application No. 2006-295324.

*Primary Examiner* — Dhirubhai R Patel
(74) *Attorney, Agent, or Firm* — Sughrue Mion, PLLC

(57) ABSTRACT

A power feeding device for a slide structure, which includes a link arm turnably provided to one of a slide structure and a fixed structure in a direction to absorb a surplus length of a wire harness, and a harness holding portion provided to a top end side of the link arm. The wire harness is provided from the harness holding portion to a harness fixing portion of the other of the slide structure and the fixed structure, is employed. The link arm is energized by a resilient member. A harness guide is provided along the link arm, and an electric wire portion of the wire harness is provided along the harness guide so as to have a surplus length. A frame-like guide case into which the wire harness is inserted in a turning direction of the link arm is provided.

6 Claims, 10 Drawing Sheets

U.S. PATENT DOCUMENTS

| | | | |
|---|---|---|---|
| 7,294,784 | B2 | 11/2007 | Watanabe et al. |
| 2006/0134934 | A1 | 6/2006 | Watanabe et al. |

FOREIGN PATENT DOCUMENTS

| | | |
|---|---|---|
| JP | 2001-151042 A | 6/2001 |
| JP | 2002-17032 A | 1/2002 |
| JP | 2002-127844 A | 5/2002 |
| JP | 2004-129371 A | 4/2004 |
| JP | 2004-357360 A | 12/2004 |
| JP | 2006-143005 A | 6/2006 |
| JP | 2006-180619 A | 7/2006 |

* cited by examiner (a)

(b)

(c)

(a)

(b)

(a)

(b)

POWER FEEDING DEVICE FOR SLIDE STRUCTURE

TECHNICAL FIELD

The present invention relates to a power feeding device for a slide structure, for feeding continuously an electric power from a fixed structure of vehicle body, or the like to a slide structure such as a slide door, or the like of a vehicle.

BACKGROUND ART

FIG. 8 shows a first mode of a power feeding device for a slide structure in the prior art (see Patent Literature 1).

A power feeding device 51 includes a guide rail 53 provided horizontally to a slide door 52 of a vehicle, a slider 54 engaged slidably with the guide rail 53, and a pair of Λ-shaped links 55, 56 which are joined to expand/contract and one end of which is coupled to the slider 54 and the other end of which is coupled to the guide rail 53.

A wire harness 57 is provided from the link 55 to a fixed portion 59 on a vehicle body 58 side via the slider 54 while bending like an almost U-shape. One end of the wire harness 57 is connected to a wire harness 60 on the slide door side via a connector, and the other end of the wire harness 57 is connected to a wire harness 61 on the vehicle body side via a connector.

A pair of links 55, 56 are opened/closed (expanded/contracted) in accordance with the open/close of the slide door 52. The slider 54 is always positioned near the fixed portion 59 on the vehicle body side while relatively moving along the guide rail 53.

FIG. 9 shows a second mode of a power feeding device for a slide structure in the prior art (see Patent Literature 2).

This power feeding device 62 is constructed such that three links 65, whose length are different respectively, are coupled between a slide door 63 of the vehicle and a vehicle body 64 to swing in the horizontal direction. A wire harness 66 is provided from the vehicle body 64 to the slide door 63 along respective links 65.

Respective links 65 are turned in their opposing direction in accordance with the open/close of the slide door 63 to absorb an amount of movement of the slide door 63.

FIG. 10 and FIG. 11 show a third mode of a power feeding device for a slide structure in the prior art (see Patent Literature 3).

This power feeding device 67 includes a protector (case) 32 made of a synthetic resin and fitted to a slide door 68 of the vehicle, and a metal plate spring 70 one end side of which is fixed to the protector 32 and the other end side of which supports/energizes a wire harness 69 upward. The protector 32 is constructed by a base 32a and a cover 32b (FIG. 12).

The wire harness 69 is provided from an opening 71 at the front end of the protector 32 on the slide door side, then provided from a long and narrow opening 72 at the bottom end of the protector 32 to a harness fixing jig 12 (FIG. 12) near the step on a vehicle body 74 side via a gangway space 73, and then connected from the harness fixing jig 12 to a wire harness (not shown) on the vehicle body side.

The wire harness 69 is composed of a plurality of electric wires covered with the insulator, and a flexible corrugate tube made of a synthetic resin to cover the electric wires. The corrugate tube has an elliptic (rectangular) cross section, and is provided from the protector 32 to the harness fixing jig 12 such that its major axis is set vertically.

When the slide door 68 in FIG. 10 is fully closed, the wire harness 69 is pulled backward around the harness fixing jig 12 as a pivot while forcing the plate spring 70 to bend downward. Also, when the slide door 68 is fully opened (FIG. 11 shows a state just before the slide door 68 is fully opened), the wire harness 69 is pulled forward around the harness fixing jig 12 as a pivot while forcing the plate spring 70 to bend downward. In contrast, when the slide door 68 is half opened, the wire harness 69 tends to sag as indicated with a chain line in FIG. 12, but this wire harness 69 is energized upward by the plate spring 70 to absorb the surplus length. As a consequence, it can be prevented that, when the door is closed in a state that the wire harness is sagged, the wire harness 69 gets caught in the door.

Patent Literature 1: JP-A-2001-122054 (FIG. 1)
Patent Literature 2: JP-A-2001-151042
Patent Literature 3: JP-A-2002-17032 (FIGS. 4 and 5)

DISCLOSURE OF THE INVENTION

Problems that the Invention is to Solve

However, in the first power feeding device 51 in FIG. 8, such a problem existed that the number of components and the weight are increased because of the long guide rail 53 and the links 55, 56. Also, in the second power feeding device 62 in FIG. 9, the wire harness 66 is bent complexly along with the turning of respective links 65, and therefore it is feared that durability of the wire harness 66 is decreased.

Also, in the third power feeding device 67 in FIG. 10, the surplus length of the wire harness 69 is absorbed (contained) in the protector 32, and a size of the protector 32 is increased. Therefore, such a problem existed that the protector 32 occupies a large space on the inside of the slide door 68 and a margin of layout of other accessories, etc. is limited. Also, because the wire harness 69 must be bent in the protector when provided, the long wire harness 69 is needed (the corrugate tube and the electric wires become long). Therefore, such a problem existed that an crease of cost and an crease of weight are brought about.

These problems will be similarly caused when respective power feeding devices are applied to the slide structure such as a slide door of an electric train, or the like, a slide door of a manufacturing equipment, a sensing equipment, or the like, for example, as well as the slide door of the vehicle. In this event, the vehicle body, the equipment main body, and the like are generally called the fixed structure.

The present invention has been made in view of the above problems, and aims at providing a power feeding device for a slide structure that can be constructed simply by using components in small numbers, and installed in a saved space at a low cost to prevent upsizing of a protector (case) and an increase in length and weight of a wire harness.

Means for Solving the Problems

In order to attain the above object, a power feeding device of the present invention for a slide structure, includes a link arm turnably provided to one of a slide structure and a fixed structure in a direction to absorb a surplus length of a wire harness; and a harness holding portion provided to a top end side of the link arm; wherein the wire harness is provided from the harness holding portion to a harness fixing portion provided to the other of the slide structure and the fixed structure.

According to the above configuration, in a situation that the slide structure is moved from/to the fixed structure in the opening/closing direction in such a configuration that the link arm is arranged in the slide structure, when the slide structure is either fully opened or fully closed, the wire harness is pulled around the harness fixing portion as a pivot and then the link arm is turned in the opposite direction to absorb the surplus length. In contrast, when the slide structure is half opened, the wire harness tends to sag down by its own weight but the link arm is turned by a rigidity of the wire harness, or the like in the direction to absorb the surplus length. Therefore, such sagging of the wire harness can be prevented. During the sliding process of the slide structure, the wire harness can be provided in the shortest distance between the harness holding portion of the link arm and the harness fixing portion on the fixed structure side. As a result, a length of the wire harness can be shortened.

Preferably, the power feeding device for the slide structure further includes a resilient member which energizes the link arm in the direction to absorb the surplus length of the wire harness.

According to the above configuration, the link arm is energized by the resilient member in the direction to absorb the surplus length and then the wire harness as well as the link arm is turned in the direction to absorb the surplus length. Therefore, the surplus length of the wire harness can be absorbed without fail. As the resilient member, the torsion coil spring is preferable in achieving a space saving.

Preferably, the power feeding device for the slide structure further includes a protection tube fixed to the harness holding portion, for protecting the wire harness. The protection tube is provided from the harness holding portion to the harness fixing portion.

According to the above configuration, the electric wire portion of the wire harness between the slide structure and the fixed structure is protected safely by the protection tube from intervention, rainwater, and the like. As the protection tube, preferably the corrugate tube having a high rigidity (spring property) is preferable in absorbing the surplus length.

Preferably, the power feeding device for the slide structure further includes a harness guide provided along the link arm. An electric wire portion of the wire harness is provided along the harness guide so as to have a surplus length.

According to the above configuration, when the electric wire portion of the wire harness is pulled together with the turning of the link arm, the surplus length portion can extend or contract to absorb a tensile force because the electric wire portion is provided to have the surplus length. It is preferable that the harness guide portion is shaped into a cylindrical shape such that the electric wire portion is installed to be protected from the external environment.

Preferably, the power feeding device for the slide structure further includes a frame-like guide case for inserting the wire harness thereinto in a turning direction of the link arm.

According to the above configuration, when the slide structure is opened/closed, the wire harness portion extended from the harness holding portion of the link arm to the harness fixing portion on the fixed structure side is swung smoothly along the guide case (to slide on the guide case). It can be prevented that the wire harness portion is floated from the guide case. When the top end side of the link arm is put into the guide case, the link arm is turned smoothly without deflection on in the same plane perpendicular to the guide case and also prying of the link arm caused when the wire harness is pulled is suppressed.

Preferably, the power feeding device for the slide structure further includes a strut provided to the guide case. The link arm is turnably supported to the strut by a shaft portion.

According to the above configuration, the guide case and the link arm are integrally constructed as a unit.

Preferably, in the power feeding device for the slide structure, the guide case is integrally formed with a low-height protector, and the link arm and the wire harness are housed in the protector.

According to the above configuration, the link arm can be easily fitted to the protector by the shaft portion, and also the resilient member can be fitted to the protector. Since it is not needed that the wire harness should be housed while bending unlike the prior art, the protector can be reduced in size (height). The link arm, the resilient member, the wire harness are protected safely in the protector without interference of the external member.

Advantages of the Invention

According to the above invention, there is no need to house the wire harness to bend, unlike the protector in the prior art, and the wire harness is provided in the shortest distance from the harness holding portion on the top end side of the link arm to the harness fixing portion on the other side. Therefore, the length of the wire harness is shortened, the surplus length of the wire harness is shortened, and the sagging down of the wire harness is suppressed. Also, a reduction in cost/weight can be attained, the insertion operation of the electric wire into the protection tube of the wire harness is facilitated, and such a situation is solved that the wire harness gets caught in a state that the wire harness is sagged. Also, a reduction in size/weight of the power feeding device can be attained without the protector. Therefore, a margin of layout of other components in the slide structure is increased, and also a fitting operation into the slide structure, or the like is facilitated.

Also, according to the above invention, the turning of the link arm in the direction to absorb the surplus length of the wire harness is executed by an energizing force of the resilient member without fail, and the surplus length of the wire harness is absorbed without fail. Therefore, an anxiety that the wire harness gets caught can be solved without fail, and reliability of the continuous power feeding can be improved.

Also, according to the above invention, the protection tube in the protector in the prior art is not needed. Therefore, the protection tube of the wire harness from the top end side of the link arm to the harness fixing portion on the fixed structure side can be set short. As a result, such advantages can be achieved that a cost is reduced, an operation of passing the electric wire through the tube is facilitated, and the like.

Also, according to the above invention, a tensile force of the electric wire portion along the link arm is absorbed along with the turning of the link arm. Therefore, no load is applied to the electric wire portion, and reliability of the continuous power feeding can be improved.

Also, according to the above invention, the wire harness is swung smoothly while a position of this wire harness is guided by the guide case. Therefore, it can be prevented that, when the slide structure is closed, the wire harness gets caught in the slide structure. Also, the guide case whose size is extremely small in contrast to the protector in the prior art is employed, and thus a reduction in cost/weight of the power feeding device can be achieved.

Also, according to the above invention, because the power feeding device manufactured as a unit is employed, the handling performance and the fitting operability of the power feeding device to the slide structure, or the like can be improved.

Also, according to the above invention, there is no need to house the wire harness to bend, unlike the protector in the prior art. Therefore, a height of the protector is reduced, the power feeding device is installed in the slide structure, or the like in a saved space, and a margin of layout of other components on the slide structure side, and the like is extended.

Figure 1:
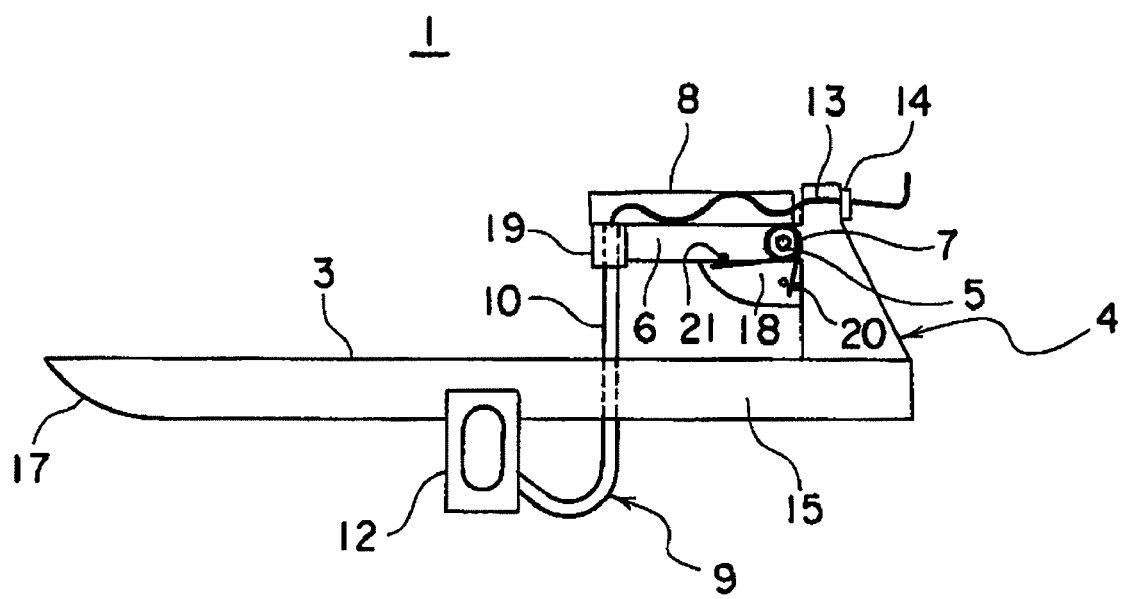
FIG. 1 A front view showing an embodiment of a power feeding device for a slide structure according to the present invention.

DESCRIPTION OF REFERENCE NUMERALS 1 power feeding device
2 slide door (slide structure)
3 guide case
4, 4' strut
5 shaft portion
6 link arm
7, 26 torsion spring (resilient member)
8 harness guide
9 wire harness
10 corrugate tube (protection tube)
11 vehicle body (fixed structure)
12 harness fixing jig (harness fixing portion)
13 electric wire portion
19 harness holding portion
22 plate spring (resilient member)
25 protector

BEST MODE FOR CARRYING OUT THE INVENTION

FIG. 1 shows an embodiment of a power feeding device for a slide structure according to the present invention.

This power feeding device 1 includes a long and narrow guide case 3 made of a synthetic resin and mounted on a slide door (slide structure) 2 of a vehicle, a strut 4 provided upright to the front end side of the guide case 3, a link arm 6 provided turnably to the strut 4 via a shaft portion 5, a torsion coil spring (resilient member) 7 for energizing upward the link arm 6, and a harness guide 8 fixed along the link arm 6.

One end portion of a synthetic-resin corrugate tube 10 of a wire harness 9 is fixed to a top end portion of the link arm 6. The corrugate tube 10 is provided to a harness fixing jig 12 on a vehicle body (fixed structure) 11 through the guide case 3 shaped into a long and narrow frame.

The other end of the corrugate tube 10 is held by the harness fixing jig 12. An electric wire portion (not shown) extended from the other end of the corrugate tube 10 is provided to the vehicle body side, and is connected to a wire harness (not shown) on the vehicle body side via a connector. The corrugate tube 10 is the existing protection tube (outer sheath) that is constructed flexibly by arranging circumferential recess grooves and projection stripes (not shown) alternately in the longitudinal direction of the tube.

Like the corrugate tube in the prior art, the corrugate tube 10 in this embodiment also has an elliptic cross section, and is provided such that its major axis is set vertically. The corrugate tube having a circular cross section can be of course employed.

An electric wire portion 13 extended from one end portion of the corrugate tube 10 is provided along the harness guide 8 to have the surplus length, and then is connected to a harness fixing portion 14 on the strut 4 side. Then, the electric wire portion 13 is provided to the slide door, and is connected the accessories and a wire harness (not shown) on the slide door side via a connector.

The guide case 3 is provided to pass the corrugate tube 10 of the wire harness 9 extended from the link arm 6 therethrough in the vertical direction and to guide it slidably in the longitudinal direction of the vehicle. The guide case 3 is constructed by a front side cover 15 and a back side base 16 (FIG. 5) to form a long rectangular shape in the longitudinal direction of the vehicle. A rear lower portion 17 of the guide case 3 is formed as a curved shape to move smoothly the wire harness.

The perpendicular plate-like strut 4 is formed of a resin integrally with the front end portion of the base 16, for example, of the guide case 3. The base 16 and the cover 15 are coupled mutually by a latching member (not shown). The wire harness 9 together with the harness fixing jig 12 can be easily inserted into the base 16 and the cover 15 when they are disassembled. Here, the "longitudinal" direction in this specification is the same as the longitudinal direction of the vehicle.

The strut 4 has a bearing wall 18 that projects backward from the upper rear end, and the link arm 6 is supported turnably by the bearing wall 18 via the shaft portion 5. The harness fixing portion 14 is provided to the upper from end of the strut 4. The harness fixing portion 14 is the fixing plate, or the like to which the electric wire is fixed by winding a band or a tape, for example.

The link arm 6 is shaped like a straight long plate or a rectangular cylinder. A harness holding portion 19 is provided to its top end portion (free end portion), and the shaft portion 5 is provided to its base end portion. The harness holding portion 19 has a hole, through which the corrugate tube 10 is passed, on the inner side of the split-type block portion, for example, and also has a rib (not shown), which engages with the circumferential recess groove of the corrugate tube 10, on the inner peripheral surface of the hole portion.

In this case, the link arm 6 is not always shaped like the straight plate. As described later (FIG. 5), the link arm 6 that are curved in two-dimensional direction or three-dimensional direction may be employed. A shape of the link arm 6 may be adjusted appropriately to meet the install requirements of the vehicle when the slide door 2 is fully closed, half closed, or fully opened.

The shaft portion 5 may be passed through the hole portion of the link arm 6, and then may be fixed to the bearing wall 18 of the strut 4. Otherwise, the shaft portion 5 may be provided integrally with the link arm 6 to protrude, and then may be engaged turnably with the hole portion of the bearing wall 18.

A toroidal coil portion 7a (FIG. 2) of the torsion coil spring 7 is fitted on the shaft portion 5, one straight portion 7b (FIG. 2) of the torsion coil spring 7 subsequent to the coil portion 7a come into contact with a locking pin 20 on the bearing wall 18 side, and the other straight portion 7c come into contact with a locking pin 21 on the link arm 6 side. The link arm 6 is energized upward by a spring force of the torsion coil spring 7. The link arm 6 is positioned horizontally in a free state (a state that no tensile force is applied). Here, the link arm 6 is not always positioned horizontally, and the link arm 6 may be positioned to incline upward or may be positioned to incline downward.

The locking pin 20 on the bearing wall 18 side is provided to project from a extended wall portion 18a (FIG. 2) on the lower side. The extended wall portion 18a is formed downward like a fun-like shape, and contacts the back surface of the link arm 6 to guide it smoothly. When the base end surface, for example, of the link arm 6 contacts the stopper projection (not shown) of the strut 4, the link arm 6 is prevented from turning upward from the horizontal position.

In FIG. 1, the harness guide 8 is arranged along the upper surface of the link arm 6 and is fixed thereto. The harness guide 8 has the almost same length as the link arm 6, and preferably the harness guide 8 is formed of synthetic resin material like a rectangular cylinder. The electric wire portion 13 of the wire harness 9 is housed in the inner space of the harness guide 8 to have the surplus length such that the electric wire portion is bent like a wavy line. A harness protection tube whose rigidity is relatively high, or the like can be employed as the harness guide 8. In FIG. 1, the electric wire portion 13 housed in the harness guide 8 is indicated with a solid line.

The harness guide 8 is used to absorb the surplus length of the electric wire portion 13 produced along with the turn of the link arm 6. The harness guide 8 is not needed when the electric wire portion 13 is provided along the center axis line of the link arm 6. In such case, the electric wire portion 13 is extracted from the center of the harness holding portion 19 at the top end of the link arm along the link arm 6, then passes through the center or its neighborhood of the shaft portion 5, and then comes up to the harness fixing portion 14 on the strut 4 side.

The harness fixing jig (harness fixing portion) 12 on the vehicle body side is the existing one. For example, this harness fixing jig 12 is constructed by an inner member (not shown) with ribs (not shown), which engage with the circumferential recess grooves of the corrugate tube 10, on its inner peripheral surface and formed as a split type, and an outer member (use also a reference numeral 12 for this member) for holding the inner member turnably in the circumferential direction.

Figure 2:
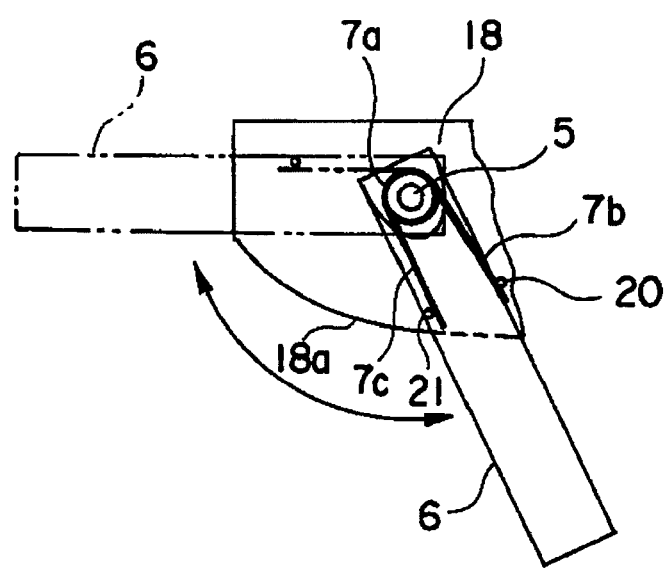
FIG. 2 A front view showing a turning state of a link arm of the power feeding device.

FIG. 2 shows a turning embodiment of the link arm 6.

In this example, when the wire harness 9 is pulled forward, the link arm 6 is turned counterclockwise against a spring force of the torsion coil spring 7, as indicated with a solid line in FIG. 2, over an angle range in excess of 90° beyond the perpendicular direction (in an example in FIG. 1, it is not needed to turn the link arm up to such range). The locking pin 20 of the bearing wall 18 is arranged more to the front than the example in FIG. 1.

When a tensile force of the wire harness 9 (FIG. 1) is released, the link arm 6 is returned clockwise by a force of the torsion coil spring 7, as indicated with a chain line. At the same time, the surplus length of the corrugate tube 10 (FIG. 1) of the wire harness 9 is absorbed.

Figure 3:
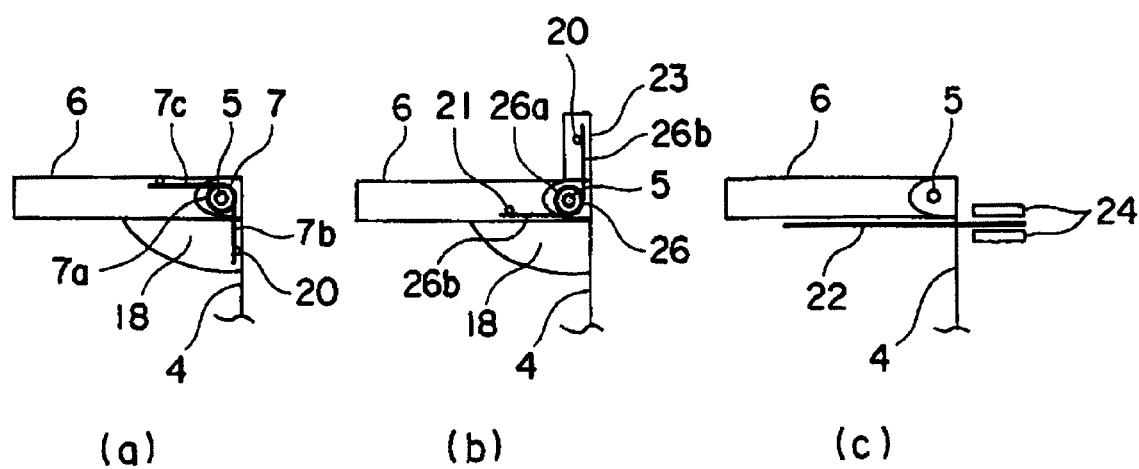
FIG. 3 (a) to (c) are front views showing various modes of a resilient member for energizing the link arm.

FIGS. 3 (*a*) to (*c*) are front views showing respective embodiments of the resilient member.

FIG. 3(*a*) shows the winding spring 7 similar to the above torsion coil spring, FIG. 3(*b*) shows an unwinding spring 26 as another embodiment of the torsion coil spring, and FIG. 3(*c*) shows a plate spring 22. Respective springs 7, 26, 22 are formed of metal material.

When outer surfaces of both straight portions 7b, 7c continued from the coil portion 7a contact the locking pin 20, the winding spring 7 in FIG. 3(*a*) exerts an energizing force to open both straight portions 7b, 7c.

The unwinding spring 26 in FIG. 3(*b*) is arranged in an inverted embodiment of the winding spring 7 in FIG. 3(*a*). When an inner surface of one straight portion 26b continued from a coil portion 26a contacts the locking pin 20 of an upper extended portion 23 of the bearing wall 18 and an inner surface of the straight portion 26c contacts the locking pin 21 on the link arm 6 side, this unwinding spring 26 exerts an energizing force to close both straight portion 26b.

The plate spring 22 in FIG. 3(*c*) is arranged horizontally. A base end portion of the plate spring 22 is inserted into a clearance between a pair of projection pieces 24 on the strut 4 side and fixed thereto. The remaining portion of the plate spring 22 except the base end portion supports the lower surface of the link arm 6. When the wire harness 9 (FIG. 1) is pulled, the link arm 6 is turned downward and simultaneously the plate spring 22 is bent downward. When the pulling of the wire harness 9 is released, the link arm 6 is restored to the horizontal position by an energizing force of the plate spring 22.

Figure 4:
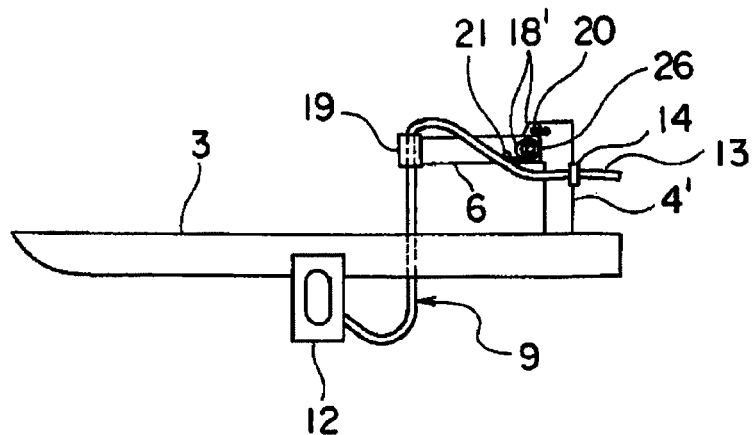
FIG. 4 (a) to (c) are front views showing various modes of a guide case of the power feeding device.
Figure 4:
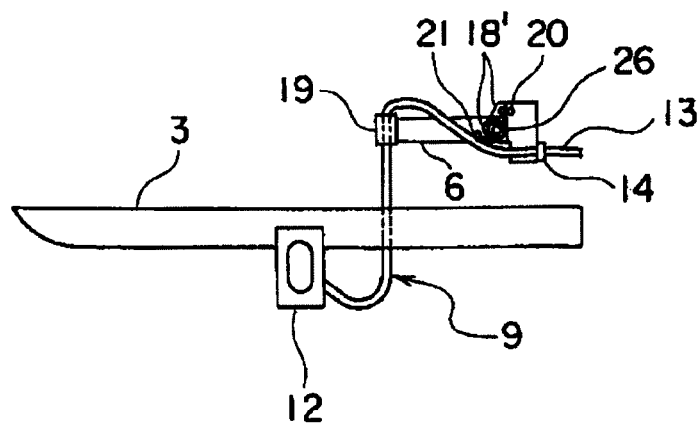
Figure 4:
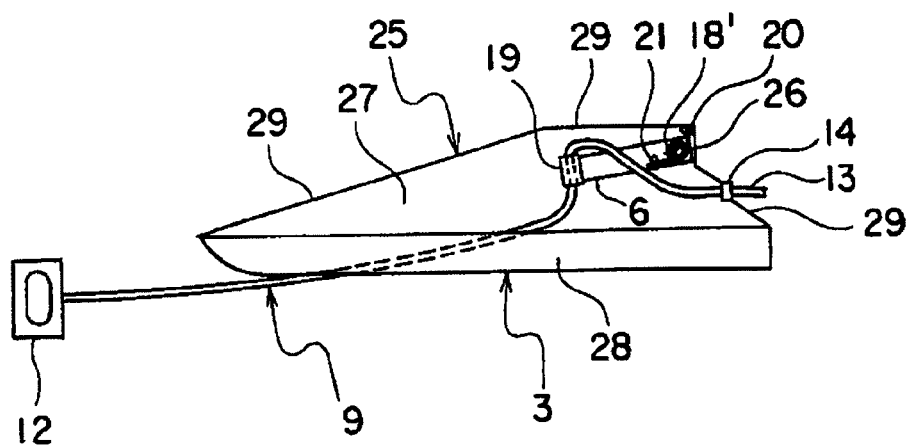

FIGS. 4 (*a*) to (*c*) show respective embodiments of the guide case 3.

FIG. 4(*a*) shows a structure that, like the example in FIG. 1, a strut 4' having a bearing wall 18' is provided integrally to the guide case 3, FIG. 4(*b*) shows a structure that the bearing wall 18' is provided to the slide door 2 (FIG. 5), e.g., a door inner panel, separately from the guide case 3, and FIG. 4(*c*) shows a structure that a protector 25 with which the guide case 3 is formed integrally is employed.

In respective embodiments, the unwinding spring 26 in the FIG. 3(*b*) is used as the resilient member as an example. As the link arm 6, the harness holding portion 19 at its top end, the wire harness 9, and the harness fixing jig 12 on the vehicle body side, the same members are employed respectively. The harness guide 8 and the lower extended wall portion 18a of the strut 4 in FIG. 1 are removed.

In FIG. 4(*a*), a straight strut is used as the strut 4' instead of the trapezoid strut in FIG. 1. The electric wire portion 13 of the wire harness 9 is provided from the harness holding portion 19 at the top end of the link arm 6 along the link arm 6 like a curved shape, and then is fixed by the harness fixing portion 14.

In FIG. 4(*b*), the strut 4' is not provided. The electric wire portion 13 of the wire harness 9 is provided from the harness holding portion 19 of the link arm 6 to by the harness fixing portion 14 at the front end of the bearing wall (bearing plate) 18' to curve. The bearing wall 18' is fixed to the door inner panel made of metal by tightening a bolt, inserting a fastening clip, or the like.

In FIG. 4(c), while being energized by the torsion coil spring 26, the link arm 6 is arranged turnably in an inner space of the protector 25 that consists of a protector base 27 on the back side and a protector cover (not shown) on the front side. Respective base plate portions of the base 27 and the cover of the protector 25 are also used as the bearing wall 18'. The locking pin 20 of the torsion coil spring is provided to protrude from the base 27. The harness fixing portion 14 is provided in the opening in the front end of the base 27.

Figure 9:
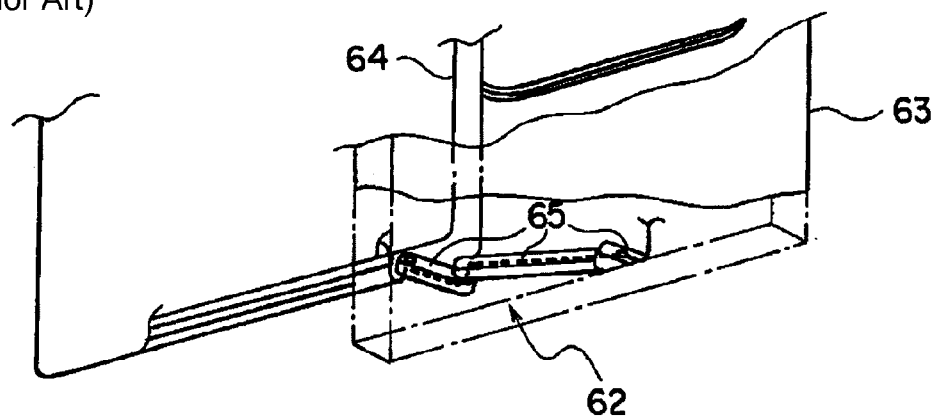
FIG. 9 A perspective view showing a second mode of a power feeding device for a slide structure in the prior art.
Figure 10:
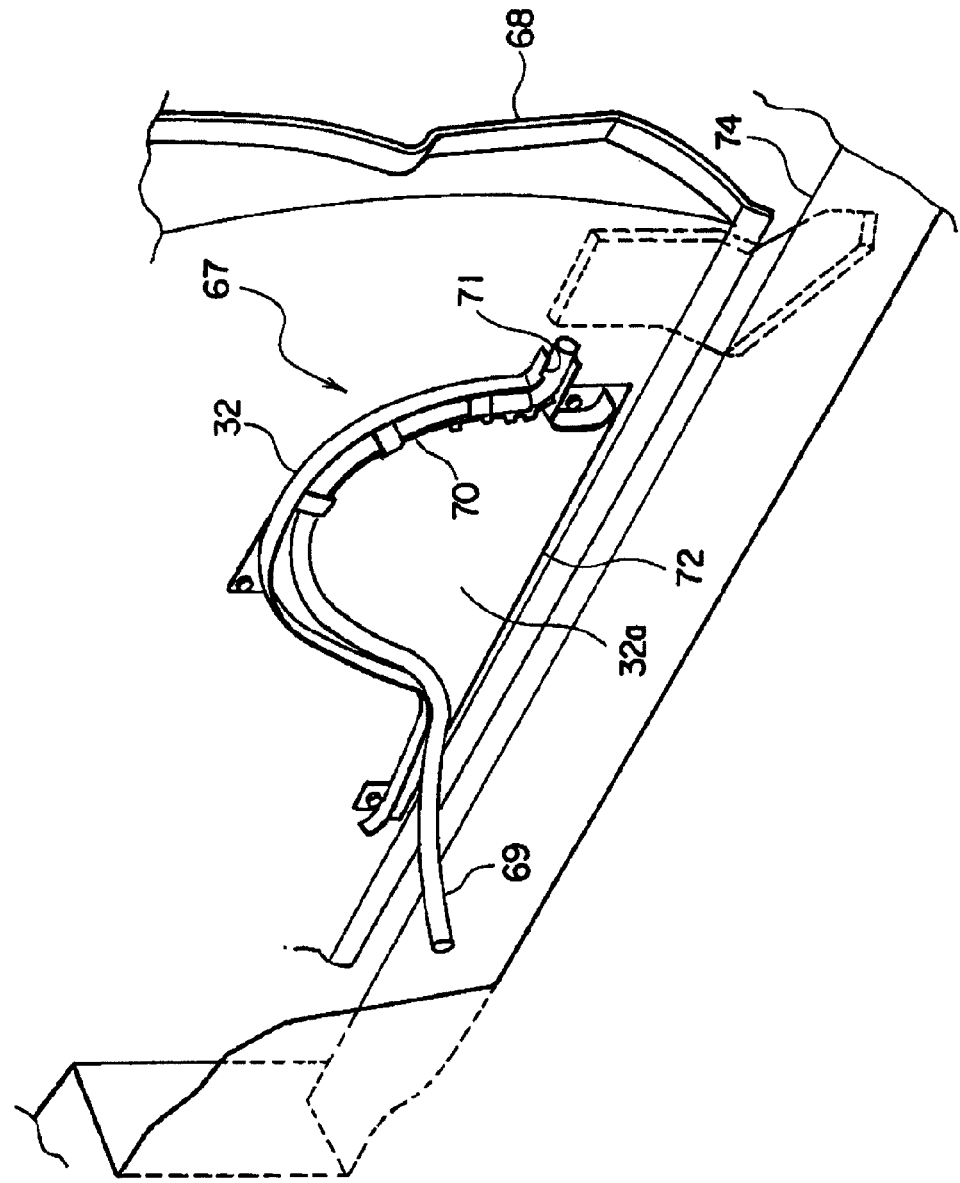
FIG. 10 A perspective view showing a third mode of a power feeding device for a slide structure in the prior art when a slide structure is fully closed.
Figure 11:
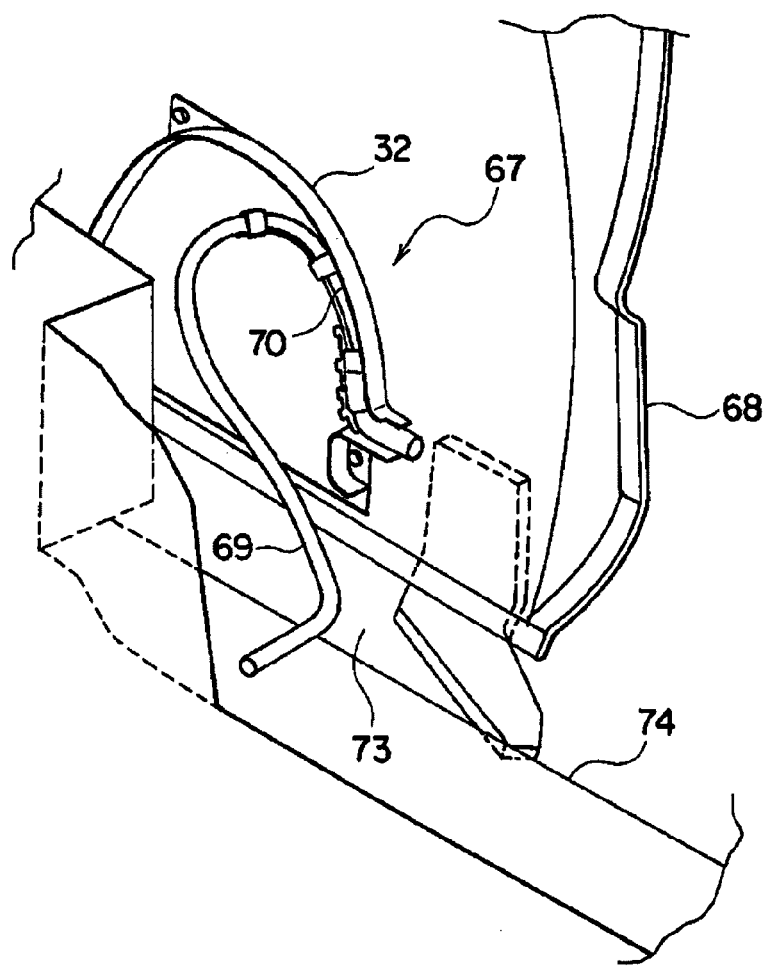
FIG. 11 A perspective view showing the same third mode just before the slide structure is fully opened.

The protector 25 is formed to have a low height that is almost half of the protector (FIG. 9) in the prior art. A long and narrow opening 28 similar to the prior art is provided in the lower end of the protector 25. The long and narrow opening 28 is similar to the opening in the guide case in FIG. 4(a) and FIG. 4(b). The protector 25 is blocked by a peripheral wall 29 in three directions, i.e., upper, front, and back sides, respectively.

Figure 5:
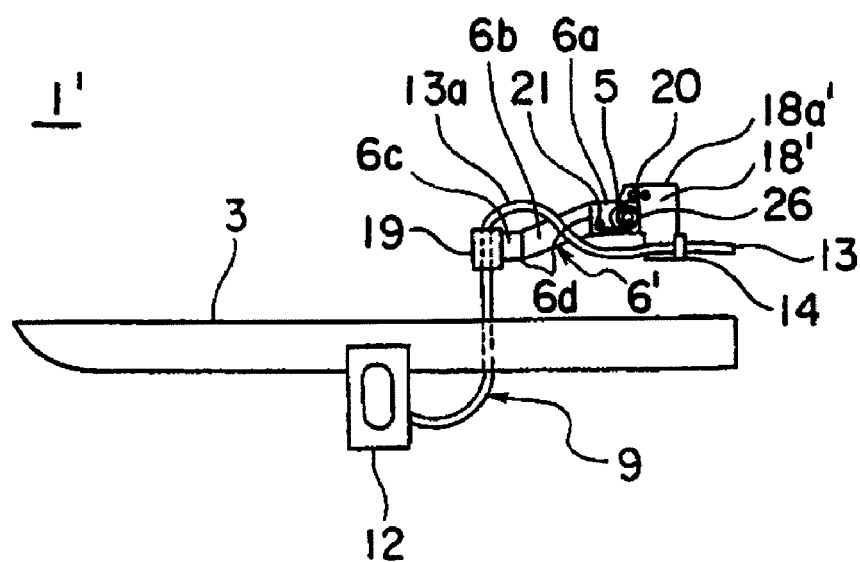
FIG. 5 (a)(b) are front views showing a power feeding device using another embodiment of the link arm respectively.
Figure 5:
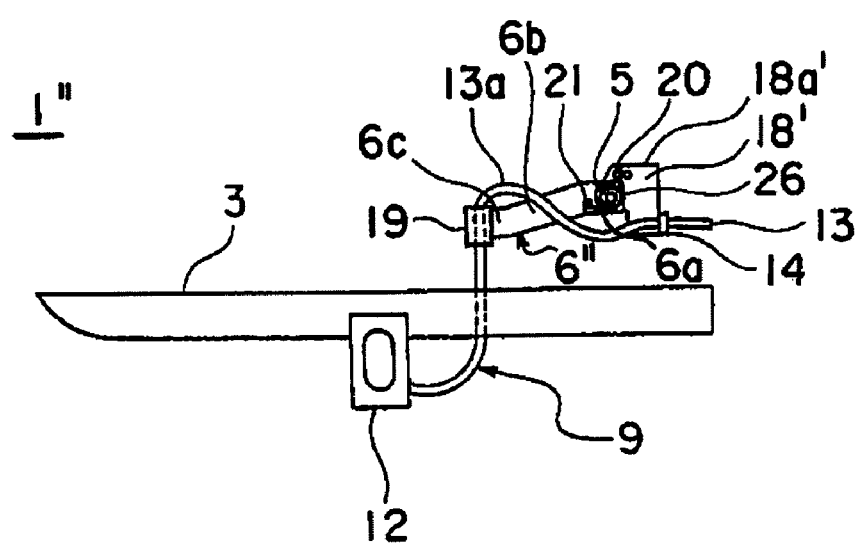

FIGS. 5 (a)(b) show a power feeding device using another embodiment of the link arm respectively. Respective configurations except the link arm are almost similar to the embodiment in FIG. 4(b). Therefore, the same reference symbols are affixed to the similar constituent portions, and thus their explanation will be omitted herein.

A link arm 6' in FIG. 5(a) has a shape that is inclined stepwise downward from the shaft portion 5 side. The link arm 6' consists of a horizontal straight portion 6a on the shaft portion (front) side, a middle inclined portion 6b, and a horizontal straight portion 6c on the top end (rear) side. Here, the term "horizontal" means merely an example of the state that the link arm 6' is lifted up by an energizing force of the torsion coil spring 26 when the slide door 2 is half opened. The link arm 6' is not always positioned horizontally. This is true of the case in FIG. 5(b). The middle inclined portion 6b and the straight portion 6c on the top end side may be bent toward the straight portion 6a on the shaft portion side in a thickness direction of the link plate at perpendicular intersection line portions 6d. The harness holding portion 19 is fixed to the straight portion 6c on the top end side.

A link arm 6" in FIG. 5(b) has a shape that is inclined downward like an almost S-shaped curve from the shaft portion 5 side. The link arm 6" consists of a short horizontal straight portion 6a on the shaft portion side, a middle long bent portion 6b, and a short horizontal straight portion 6c on the top end (rear) side. The middle inclined portion 6b and the straight portion 6c on the top end side may be bent toward the straight portion 6a on the shaft portion side in a thickness direction of the link plate. The harness holding portion 19 is fixed to the straight portion 6c on the top end side.

According to the embodiments in FIGS. 5(a)(b), when the slide door 2 is half opened, the top end side of the link arms 6', 6", i.e., the harness holding portion 19, is positioned lower than the shaft portion 5. As a result, it is not feared that an electric wire portion 13a projected upward from the harness holding portion 19 projects out to the upper side than an upper end 18a' of the bearing wall 18', and also a reduction in height of power feeding devices 1', 1" can be attained more surely.

FIGS. 6(a),(b) show an action of an embodiment of the power feeding device 1 when the slide door 2 is opened/closed. FIG. 6(a) shows a front view and FIG. 6(b) shows a plan view, wherein the right-side view shows a state that the door is fully closed and the left-side view shows a state that the door is fully opened. For convenience, the fully opened state and the fully closed state are indicated with a solid line respectively.

Figure 6:
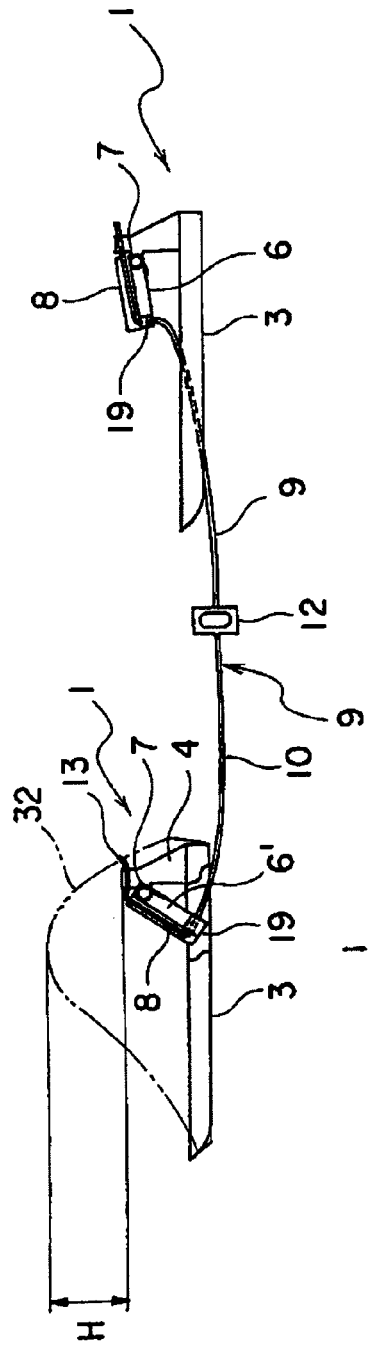
FIG. 6 (a) is a front view showing an action of the power feeding device in opening/closing a slide structure, and (b) a plan view showing an opened/closed state of the same slide structure.
Figure 6:
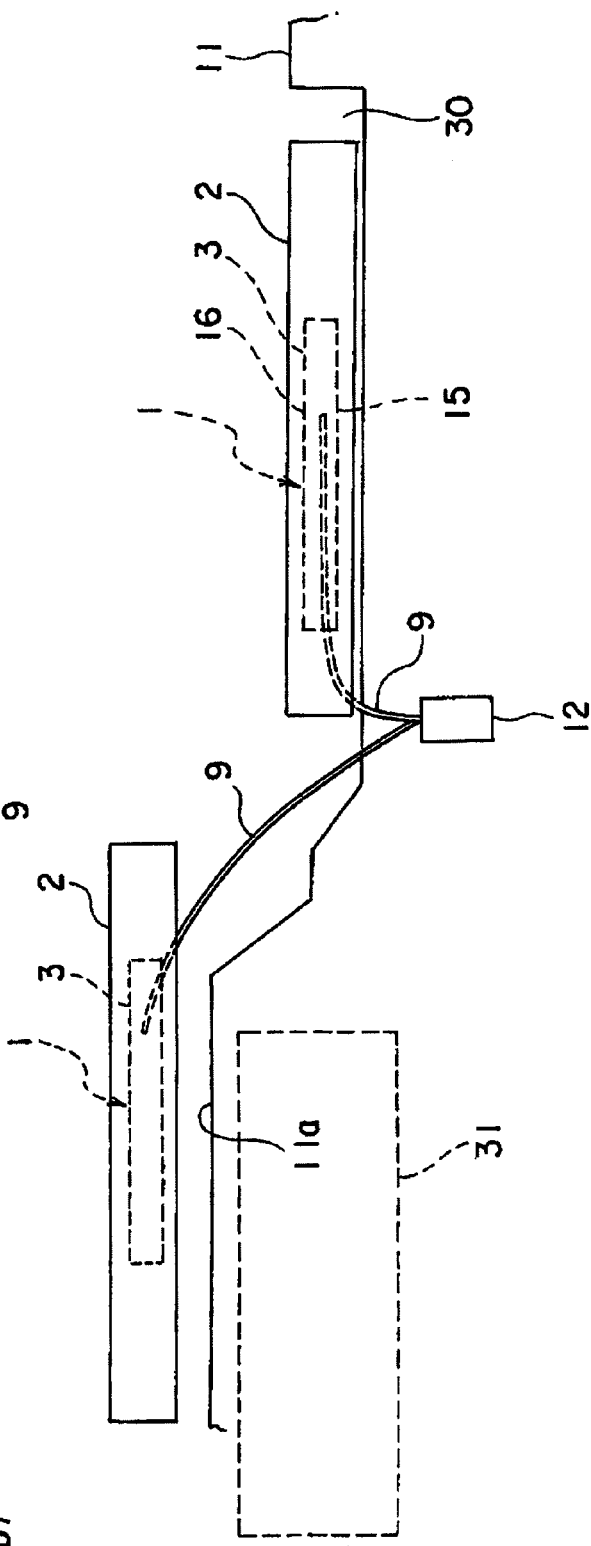

FIG. 7(a) shows a state that the slide door 2 is fully closed and is half opened in an enlarged fashion, and FIG. 7(b) shows a state that the slide door 2 is fully opened in an enlarged fashion, which correspond to FIG. 6. For convenience, the fully opened state and the fully closed state are indicated with a solid line respectively. In this case, FIG. 1 and FIGS. 4(a)(b) show the half closed state of the slide door 2, and FIG. 4(c) shows the fully closed state of the slide door 2.

As shown in FIG. 7(a), when the slide door 2 is fully closed (the slide door 2 is slid to the front side of the vehicle and is fully closed), the wire harness 9 is pulled backward around the harness fixing jig 12 on the vehicle body 11 side as a pivot. According to this, the link arm 6 is turned downward against the urging of the torsion coil spring 7 and is inclined lower than the horizontal position.

Because the link arm 6 is turned downward, the harness holding portion 19 at the top end of the link arm 6 and the harness fixing jig 12 of the vehicle body side are connected in the shortest distance. As a result, the length of the corrugate tube 10 of the wire harness 9 can be suppressed to the shortest length.

When the slide door 2 is half opened, the wire harness 9 tends to sag down between the slide door 2 and the vehicle body 11 (FIG. 6). In this moment, the link arm 6 is pushed upward by an energizing force of the torsion coil spring 7, and then the harness holding portion 19 at the top end side is lifted up. As a result, the corrugate tube 10 of the wire harness 9 is pulled up, so that the sagging of the wire harness 9 can be prevented.

Because the link arm 6 is turned upward, the harness holding portion 19 at the top end of the link arm 6 and the harness fixing jig 12 of the vehicle body side are connected in the shortest distance. As a result, the length of the corrugate tube 10 of the wire harness 9 can be suppressed to the shortest length.

When the link arm 6 is positioned (restored) horizontally, a horizontal distance between a front end 8a of the harness guide 8 and the harness fixing portion 14 on the strut 4 side becomes short. According to this, the electric wire portion 13 of the wire harness 9 is bent wavily in the harness guide 8, and thus the surplus length of the electric wire portion 13 can be housed.

As shown in FIG. 7(b), when the slide door 2 is fully opened, the wire harness 9 is pulled forward around the harness fixing jig 12 on the vehicle body side as a pivot. According to this, the link arm 6 is turned largely downward against the spring force of the torsion coil spring 7 and is positioned to incline close to the verticality. The electric wire portion 13 in the harness guide 8 is extended into an almost straight state around the harness fixing portion 14 on the strut 4 side as a pivot, along with the turn of the harness guide 8 that is formed integrally with the link arm 6.

Because the link arm 6 is turned downward, the harness holding portion 19 at the top end of the link arm 6 and the harness fixing jig 12 of the vehicle body side are connected in the shortest distance. As a result, the length of the corrugate tube 10 of the wire harness 9 can be suppressed to the shortest length.

As shown in FIG. 7(b), the top end side of the link arm 6 enters into the frame-like guide case 3, and then is guided smoothly along the inner surface of the guide case 3 not to receive a prying force applied in the harness extending direction. Following upon the open/close of the slide door, the corrugate tube 10 of the wire harness 9 is swung smoothly along the guide case 3 in the longitudinal direction of the vehicle.

As shown in FIG. 6(b), the slide door 2 when closed fully comes tightly into contact with the vehicle body 11 to block an opening 30 at which the passenger gets on and off. Then, the slide door 2 just after opened goes away from the vehicle body 11 to the outer side. Then, the slide door 2 when opened fully is positioned along an outer surface 11a of the vehicle body 11. These states are similar to those in the prior art. A reference numeral 31 denotes a rear tire.

A difference in height between a protector 32 (indicated with a chain line) in the prior art and the power feeding device 1 of the present invention is indicated with a dimension H in FIG. 6(a). As shown in FIG. 6(a), a height of the power feeding device 1 of the present invention is reduced to an almost half of the protector 32 in the prior art. Accordingly, a space that the power feeding device 1 occupies in the slide door 2 can be deleted, and a margin of layout of respective accessories (electrical components, various devices, etc.) in the slide door can be increased.

Also, the wire harness 9 is provided directly from the link arm 6 to the vehicle body side not to bend the wire harness 9 in the protector. Therefore, the length of the wire harness 9 can be suppressed short, a reduction in cost and a reduction in weight can be attained, and the conveyance and the fitting operation to the vehicle can be facilitated. Also, because the length of the corrugate tube 10 can be suppressed short, the operation of inserting the electric wire portion 13 into the corrugate tube 10 (particularly, the tube that does not have a slit in the longitudinal direction) can be made easily.

Figure 12:
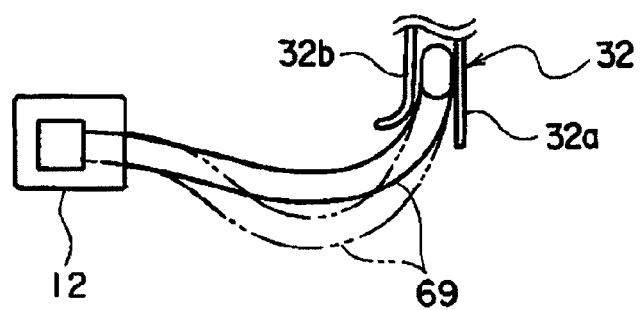
FIG. 12 A side view showing a sagged state of a wire harness.

Also, it is not needed to accommodate the surplus length portion of the wire harness 9 in the protector 32. Therefore, the sagged state of the wire harness 9 as indicated with a solid line in FIG. 12 is hard to occur between the slide door 2 and the vehicle body 11, and also such a fear can be overcome that, when the slide door is closed, the wire harness 9 gets caught in the door.

Figure 7:
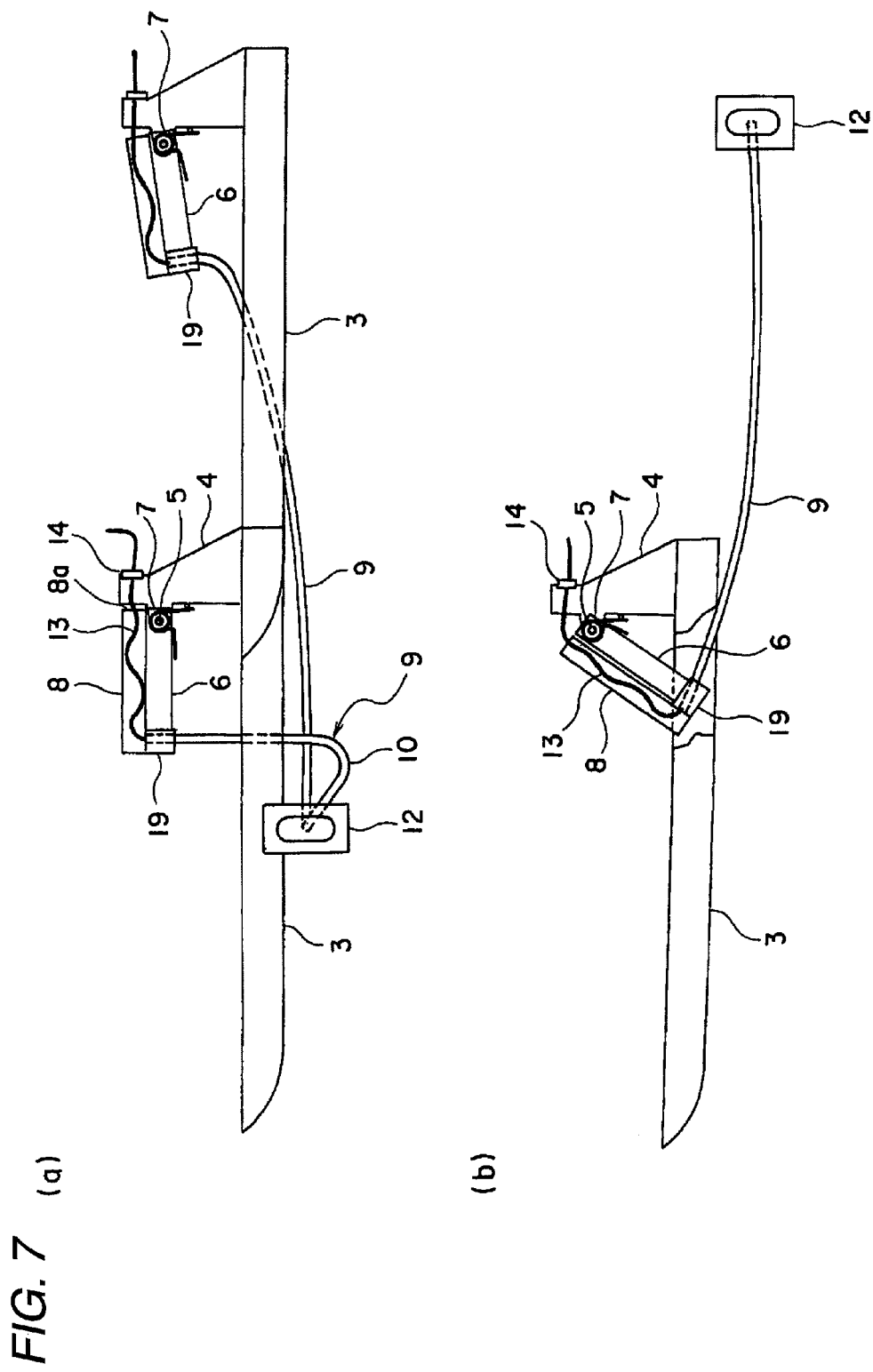
FIG. 7 (a) is a pertinent front view showing an action of the power feeding device when the slide structure is fully closed and half opened, and (b) is a pertinent front view showing an action of the same power feeding device when the slide structure is fully opened.
Figure 8:
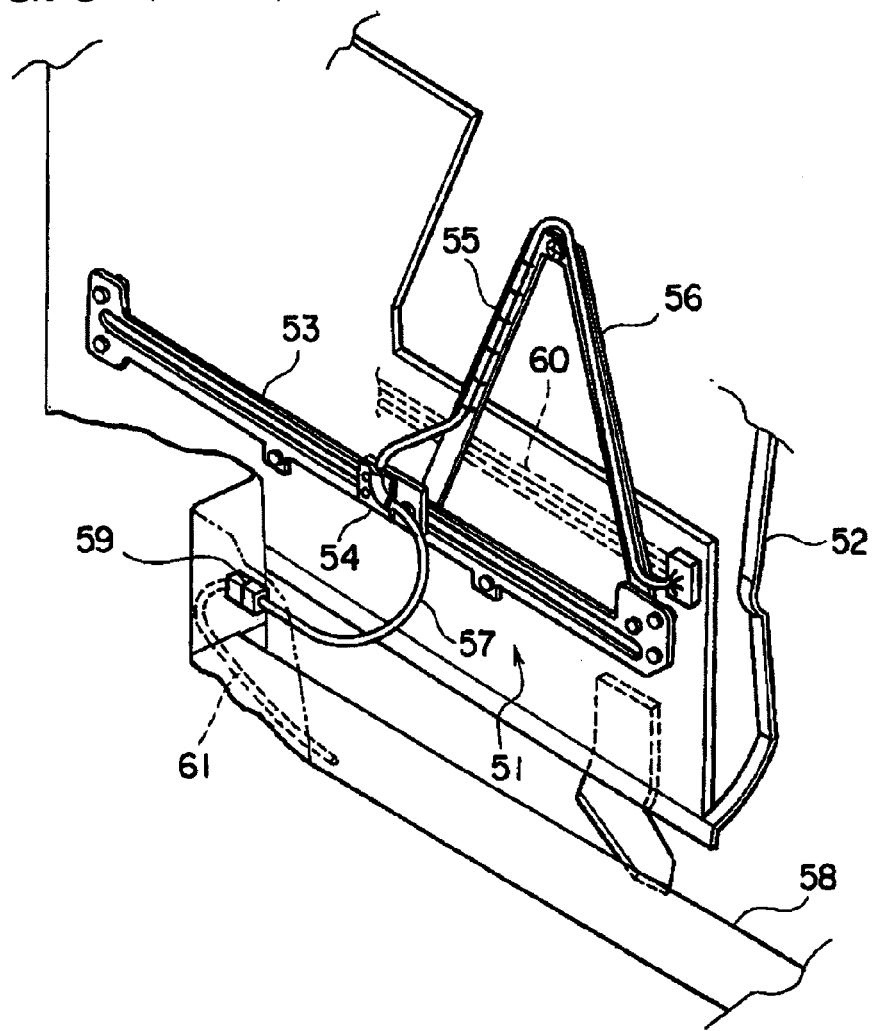
FIG. 8 A perspective view showing a first mode of a power feeding device for a slide structure in the prior art.

In the above embodiment, the power feeding device 1 is arranged on its side (vertically) in the slide door (slide structure) 2. In this case, for example, when the slide door 2 has a margin in thickness in a situation that FIG. 7 and FIG. 8 are viewed as a plan view respectively, the power feeding device 1 can be arranged on its flat (horizontally) in the slide door 2. This situation can also be applied to the slide door other than the vehicle.

Also, the power feeding device 1 may be arranged on its flat (horizontally) not in the slide door 2 but in the vehicle body (fixed structure) 11, and the harness fixing jig 12 may be arranged not in the vehicle body 11 but in the slide door 2.

Also, in the above embodiment, the corrugate tube 10 is employed as the harness protection tube. A resin tube without an unevenness (bellows) or a flexible net-like tube (not shown), and the like may be employed other than the corrugate tube. Otherwise, a plurality of electric wires 13 that are tied together by winding a tape, or the like may be employed not to use the protection tube. In these cases, the harness holding portion 19 on the top end side of the link arm is held/fixed to the top end portion of the link arm by a band, or the like.

Also, in the above embodiment, the guide case 3 for guiding the wire harness 9 to the vehicle body side in a low position is employed. In this case, for example, the guide case 3 may be deleted, and the wire harness 9 may be provided directly from the harness holding portion 19 on the top end side of the link arm to the vehicle body side.

Also, in the above embodiment, a turning range of the link arm 6 is set within 90° from the horizontal direction. In this case, a turning position and a turning angle of the link arm 6 can be set appropriately in response to a stroke amount of the slide door 2 and a length of the wire harness 9. For example, when the slide door 2 is half opened, the link arm 6 can energized/turned upward to exceed the horizontal direction, which can deal with an increase of absorbing amount of the surplus length of the wire harness.

Also, in the above embodiment, the resilient members 7, 24, 26 for energizing the link arm 6 in the direction to absorb the surplus length of the wire harness (the upward direction) are provided. In this case, the resilient members 7, 24, 26 may be deleted, and the wire harness 9 may be restored upwardly (the surplus length absorbing direction) by utilizing a rigidity of the corrugate tube 10, for example, when the slide door 2 is half opened.

Also, in the above embodiment, an example in which the power feeding device of the present invention is applied to the slide door 2 of the vehicle is explained. In this case, the power feeding device of the present invention is not limited to the slide door 2 of the vehicle, and the power feeding device of the present invention is applicable to the slide structure such as a slide door of an electric train, a slide door of a manufacturing equipment, a sensing equipment, etc., and the like. The vehicle body 11, and the like are generally called the fixed structure.

Also, the above power feeding device for the slide structure is effective as a power feeding structure for a slide structure, a harness providing structure of a slide structure, a power feeding method for a slide structure, and the like.

The invention claimed is:

1. A power feeding device for a slide structure, comprising:
   a link arm provided turnably with respect to one of the slide structure or a fixed structure, the link arm including one end that pivots via a pivotal axis and a free end opposite the one end;
   a resilient member which biases the link arm in a direction to absorb a surplus length of a wire harness; and
   a harness holding portion provided at the free end of the link arm that holds the wire harness,
   wherein the wire harness extends from the harness holding portion to a harness fixing portion, the harness fixing portion provided at the other of the slide structure or the fixed structure; and
   wherein the link arm turnably moves in a turning plane which is perpendicular to a facing direction in which the slide structure faces the fixed structure.

2. The power feeding device for the slide structure according to claim 1, further comprising:
   a protection tube fixed to the harness holding portion, and which protects the wire harness,
   wherein the protection tube is provided from the harness holding portion to the harness fixing portion.

3. The power feeding device for a slide structure according to claim 1, further comprising: a harness guide provided along the link arm that guides the wire harness, wherein an electric wire portion of the wire harness is provided along the harness guide so as to have a surplus length.

4. The power feeding device for the slide structure according to claim 1, further comprising:
   a frame-like guide case for inserting the wire harness thereinto in a turning direction of the link arm.

5. The power feeding device for the slide structure according to claim 4, further comprising:
   a strut provided on the guide case,
   wherein the link arm is turnably supported to the strut by a shaft portion.

6. The power feeding device for the slide structure according to claim 4,
   wherein the guide case is integrally formed with a low-height protector, and the link arm and the wire harness are housed in the protector.

* * * * *